Patented Aug. 9, 1938

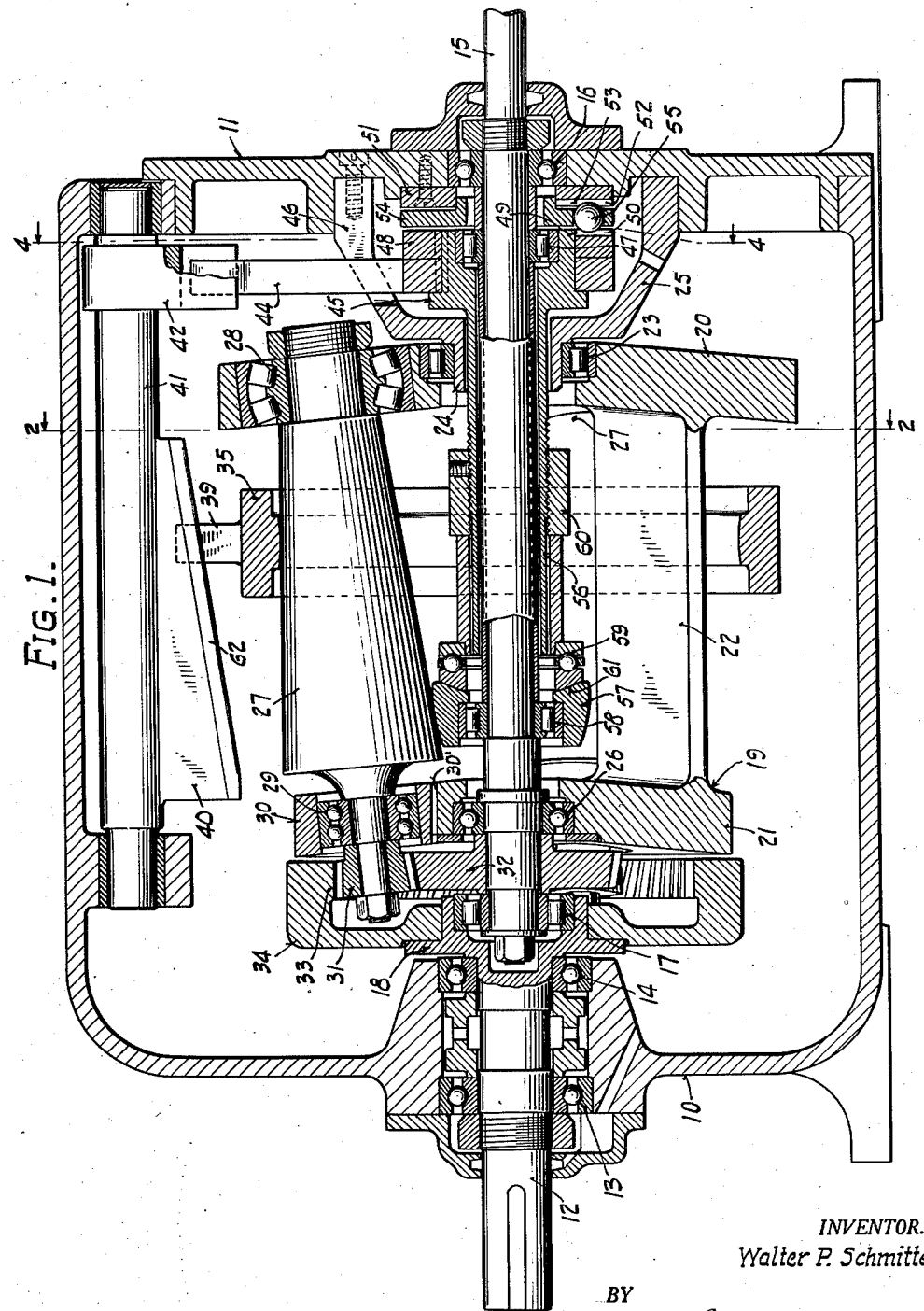

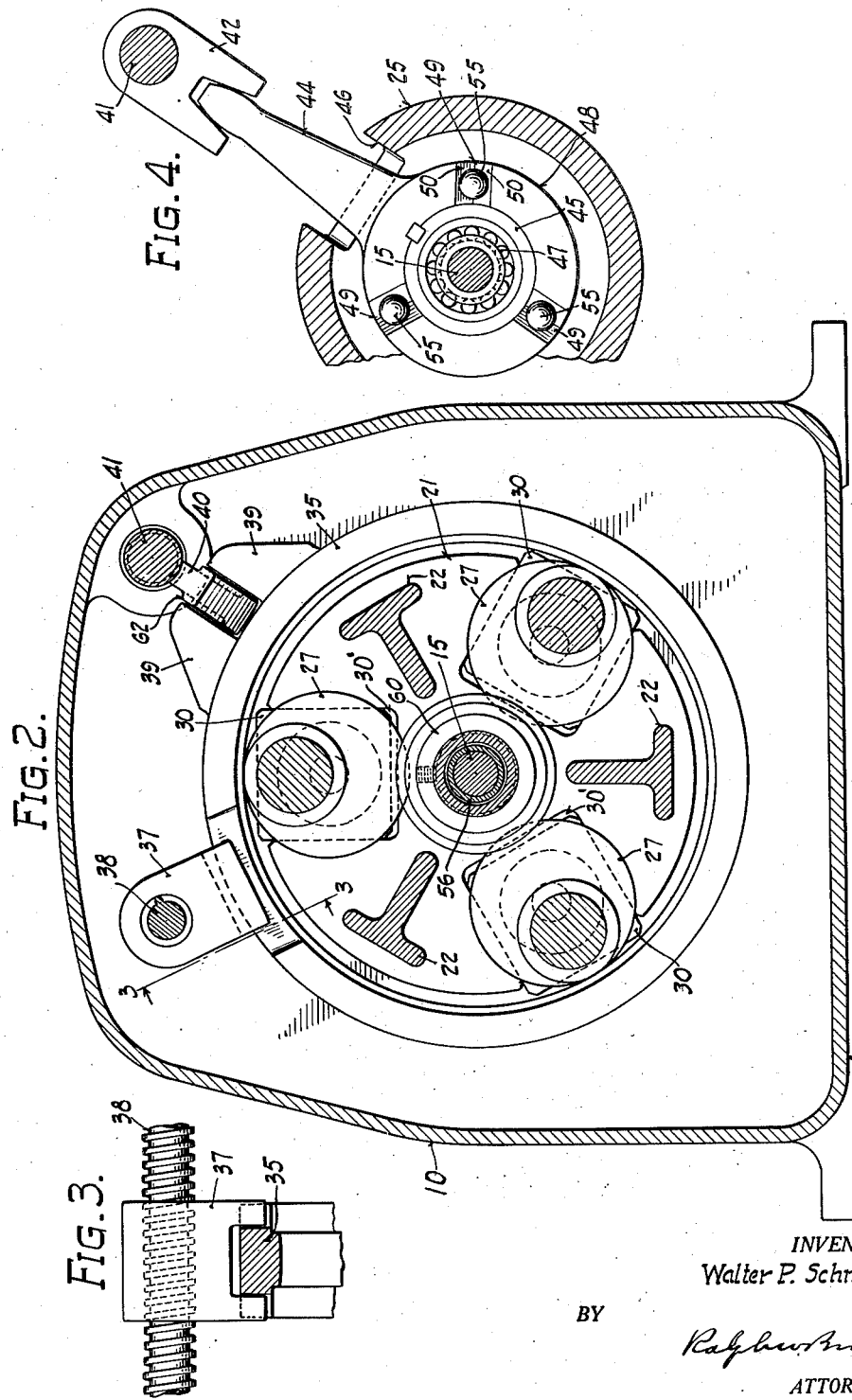

2,126,508

UNITED STATES PATENT OFFICE 2,126,508

VARIABLE SPEED TRANSMISSION

Walter P. Schmitter, Milwaukee, Wis., assignor to The Falk Corporation, Milwaukee, Wis., a corporation of Wisconsin Application January 18, 1937, Serial No. 121,119

15 Claims. (Cl. 74—281)

This invention relates to variable speed transmissions of the type involving a set of inclined tapered planet rollers and a contact ring adjustable lengthwise thereof to regulate their planetary action.

A variable speed transmission of this type, which has proven commercially successful, is disclosed in the copending application of myself and Alfred G. Bade, Serial No. 52,095, filed November 29, 1935. In the transmission therein disclosed, the control element is in the form of a ring which encircles and contacts the rollers, the required contact pressure between the rollers and ring being maintained by a pressure inducing device which functions to force the rollers along their outwardly inclined axes. This results in a peculiar reaction between the rollers and ring, which limits the degree of contact pressures thus obtained and which prevents automatic reduction of those pressures as the load on the transmission decreases, so that when operating at light loads the contact pressures are unnecessarily high, subjecting the transmission to unnecessary wear and tear.

One object of the present invention is to provide, in a transmission of the character mentioned, a novel combination and arrangement of parts which will render the contact pressure between the rollers and the contact element automatically responsive to the torque load on the transmission. This I accomplish by utilizing the reactive force of the rollers upon the contact ring, to force the rollers outwardly against the ring.

Another object is to provide an improved means for developing the required contact pressures.

Another object is to provide a novel combination and arrangement of parts which will simplify the transmission and facilitate assembly.

Other objects and advantages will appear, either expressed or implied, from the following description of an illustrative embodiment of the present invention.

In the accompanying drawings:

Figure 1 is a longitudinal sectional view of a variable speed transmission embodying the present invention.

Fig. 2 is a transverse sectional view along the line 2—2 of Fig. 1.

Fig. 3 is a fragmentary view along the line 3—3 of Fig. 2 showing the method of mounting the control ring.

Fig. 4 is a fragmentary view along the line 4—4 of Fig. 1.

The variable speed transmission shown in the drawings is somewhat similar to that described in the application identified above. It is contained in a housing 10, closed at one end and having a head 11 by which the other end may be closed. A driven shaft 12 is journalled in bearings 13 and 14 in one end of the housing. A drive shaft 15 aligned with the driven shaft 12 is journalled in a bearing 16 in the head 11 at the opposite end of the housing and in a bearing 17 mounted in a head 18 fixed on the end of the driven shaft 12.

Surrounding the drive shaft 15 within the housing 10 is a rotor 19 comprising a disk or head 20 and a second disk or head 21 rigidly connected by cross bars 22 preferably T-shaped in cross section. The head 20 is mounted upon a bearing 23 seated upon a tubular hub portion 24 of a cage 25 which is fixed to and projects inwardly from the head 11 of the housing around the bearing 16 of the drive shaft. The head 21 is likewise mounted upon a bearing 26 upon the drive shaft 15 near its opposite end. The rotor 19 is thus freely rotatable about the common axes of the shafts 12 and 15.

Carried by the rotor 19 is a set of tapered planetary rollers 27 in any convenient number; three such rollers as shown in the drawings have been known to produce satisfactory results. These tapered rollers 27 are mounted in an inclined position so that their outer edges normally are substantially parallel to the axes of the shafts 12 and 15, and so that the axes of the rollers, if extended, would meet at a common apex on the extended axes of the shafts 12 and 15.

Each of the tapered rollers 27 is mounted at its smaller end in the head 20 of the rotor 19 by means of a spherical or self-aligning bearing 28 of a well known type, which provides a fixed fulcrum for that end of the roller permitting angular displacement of the roller relative to the fixed central axis.

The opposite or large end of each of the rollers 27 is journalled by means of a bearing 29 in a slide block 30 guided in a radial slot 30' formed in the head 21 of the other end of the rotor 19. By this means the rollers 27 are secured to rotate with the rotor 19, but are free at one end to move radially outward from the central axis of the rotor.

Upon the end of each of the rollers 27 is fixed a pinion gear 31. These pinions 31 together constitute a set of planet gears which engage with and revolve about a sun gear 32 fixed to the drive shaft 15. The planet pinions 31 also are engaged with an internally toothed ring gear 33 mounted upon a disk 34 fixed to the head 18 of the driven shaft 12. The internal gear 33, the planet pinions 31 and the sun gear 32 are preferably so formed as to provide excess clearance at the bases of their teeth so as to permit slight outward movement of the rollers 27 and their pinions 31 without objectionable interference.

The rollers 27 and the pinions 31 are rotated about their axes by engagement of the pinions with the sun gear 32 upon the drive shaft 15. From this rotary motion planetary movement of the rollers about the drive shaft 15 is induced by rolling contact of the rollers with a control ring 35. The control ring 35 encircles and contacts all of the rollers 27, and by movement along the rollers axially of the rotor 19, serves to regulate and govern the planetary action of the rollers. This axial movement of the control ring 35 is effected by a nut 37 bifurcated to receive the periphery of the ring and carried by and in screw threaded engagement with a screw rod 38 journalled in the housing 10 and extending lengthwise of the rollers.

In order that the gripping contact of the rollers against the control ring 35 may automatically respond to the torque load on the transmission, the rotary drag of the rollers against the control ring is translated into an outward thrust tending to press the rollers more firmly into contact with the control ring. For this purpose the control ring 35, which floats freely around the rollers 27, is restrained from rotation with the rollers solely by either of two lugs 39 fixed to and projecting radially from the ring. These lugs 39 confine between them a fin 40 projecting from a rock shaft 41 journalled in the housing 10. Near the end of the shaft 41 is fixed a lug 42 bifurcated to receive the end of a lever 44 fixed to and projecting outwardly from a rockable thrust member 45 situated within the cage 25, the lever 44 projecting through a slot 46 in the cage 25. By means of a bearing 47 the member 45 is mounted upon the drive shaft 15, which may nevertheless rotate freely within it.

By this system of levers, the rotary impulse of the control ring 35, produced by the drag of the rollers 27, is transmitted through the fin 40, the rock shaft 41, the lug 42 and the lever 44, and tends to turn the member 45 about the axis of the shaft 15.

Surrounding the member 45 adjacent the housing 11 is a ring 48 keyed to the member 45, and which has formed on its outer face a series of shallow radial grooves 49, having inclined sides 50. A similar stationary ring 51 is affixed to the head 11 of the housing opposite the ring 48 and has similar grooves 52 situated opposite the grooves 49, and having inclined sides 53. Between the rings 48 and 51 is a cage 54 loosely surrounding the shaft 15, and serving as a carrier for a series of balls 55 corresponding to and fitting into the grooves 49 and 52. By such an arrangement, the tendency of the ring 45 to rotate will result in wedging the balls 55 between the cam surfaces provided by the inclined sides of the opposing grooves, thus translating the rotary motion of the member 45 into an axial thrust.

This axial thrust is carried by a sleeve 56 extending from the member 45 and surrounding the shaft 15, and is transmitted to an internal ring 57 contacting the rollers 27 near their large ends. The ring 57 surrounds the shaft 15 and is mounted thereon by a bearing 58. Between the ring 57 and the sleeve 56 is interposed a thrust bearing 59 and a second sleeve 60 surrounding the sleeve 56 and in screw threaded engagement therewith to permit an initial adjustment of the effective length of the sleeve 56. The contact surface 61 between the ring 57 and the thrust bearing 59 is preferably of spherical form in order to distribute the thrust over the ring 57.

Through the arrangement noted, axial thrust on the sleeve 56 results in wedging the ring 57 against the rollers 27, and thus forces the free ends of the rollers 27 radially outward from the central axis against the control ring 35. The rotary drag of the rollers 27 against the control ring 35 is thus translated to induce outward pressure of the rollers 27 against the control ring. Since the rotary drag of the rollers 27 against the ring 35 will increase as the torque upon the rollers increases, an initial gripping contact being presumed, the mechanism will thus operate to increase the pressure of the rollers against the ring in response to such increase in torque.

Because the internal ring 57 presses upon the rollers 27 near their free ends opposite the fulcrum provided by the self-aligning bearing 28, the rollers 27 themselves will have a lever action, so that a constant end thrust upon the sleeve 56 will produce greater pressure between the rollers 27 and the control ring 35 when the control ring is near the fulcrum bearing 28 than when it is near the opposite end of the rollers. To compensate for this discrepancy, provision is made for increasing the end thrust on the sleeve 56 as the control ring 35 nears the large end of the rollers. In this instance this is accomplished by cutting the fin 40 on a bias, as shown in Fig. 1, and forming a flange 62 along its inclined edge. The lugs 39 will thus engage the flange 62 at varying distances outward from the axis of the rock shaft 41, depending upon the axial position of the control ring 35. Thus when the control ring 35 is near the large end of the rollers, the greater leverage of the fin 40 will induce a greater thrust upon the sleeve 56 and the internal ring 57.

As may be seen from the drawings, the control ring 35 has been mounted around the rollers 27 in such fashion that it floats freely in every direction radially of the axis of the shaft 15. It may thus compensate for any inequalities in the adjustment of the rollers 27, and serves to distribute and equalize the pressures between the ring and the rollers 27.

It is of course understood that power will be transmitted through this transmission in a manner similar to that of the application above identified. Rotation of the drive shaft 15 and the sun gear 32 causes the pinions 31 and the rollers 27 to revolve on their axes and to partake of a planetary movement around the drive shaft 15. This planetary motion is induced and governed by rolling contact of the rollers 27 against the control ring 35. The combined rotary and planetary movement of the pinions 31 is transmitted through the ring gear 33 to cause rotation of the driven shaft 12. Since the planetary action of the rollers 27 varies as the control ring 35 is shifted axially of the transmission, the speed of the driven shaft 12 will thus be varied correspondingly, while the speed of the driving shaft 15 remains constant.

Various changes may be made in the embodiments of the invention hereinabove specifically described without departing from or sacrificing the advantages of the invention as defined in the appended claims.

I claim:—

1. In a variable speed transmission, the combination of a rotor, an inclined tapered planet roller rotatable with and with respect to said rotor, a rigid control member contacting said roller, means including said rotor for mounting said member and roller for movement relative to one another in a direction lengthwise of said roller to regulate the speed ratio of the transmission, said roller reacting on said member to impose a torque load on the latter, and means resisting the torque load on said member and reacting on said roller to develop contact pressures between said roller and member.

2. In a variable speed transmission, the combination of a rotor, an inclined tapered planet roller rotatable with and with respect to said rotor, a circular control member contacting said roller, means including said rotor for mounting said member and roller for movement relative to one another in a direction lengthwise of said roller, said roller reacting on said member to impose a torque load thereon, and means resisting the torque load on said member and reacting on said roller to force said roller against said member to develop pressure contact therebetween.

3. In a variable speed transmission, the combination of a plurality of tapered relatively inclined planetary rollers, rotary carrier means therefor, a rigid control ring encircling and contacting said rollers and moveable lengthwise thereof to regulate their motion, means restraining said ring against rotation, and means responsive to the reaction between said ring and said restraining means for developing contact pressures between said rollers and ring.

4. In a variable speed transmission, the combination of a rotor, a plurality of inclined tapered planet rollers rotatable with and with respect to said rotor, a circular control member, means including said rotor for mounting said member and rollers for movement relative to one another in directions both lengthwise and transversely of said rollers, means for effecting said relative lengthwise movement to regulate the speed ratio of the transmission, means for effecting said transverse movement to develop pressure contact between said rollers and said member, said rollers reacting on said member to impose a torque load thereon, and means for transmitting the torque load on said member to said last named means to energize the latter.

5. In a variable speed transmission, the combination of a group of tapered planetary rollers mounted to revolve about a common central axis and to rotate about their individual axes inclined relative to the central axis, control means encircling and contacting said group of rollers and moveable lengthwise thereof, means disposed concentrically of said group of rollers and moveable lengthwise of said rollers to force the latter outwardly against said control means, and means responsive to the torque load on said transmission for actuating said last named means.

6. In a variable speed transmission, the combination of a group of tapered relatively inclined rollers mounted for planetary movement about a common central axis, control means encircling and contacting said rollers and moveable lengthwise thereof, a member moveable along said axis to force said rollers into pressure contact with said control means, and means energized by the torque load on said control means for actuating said member.

7. In a variable speed transmission, the combination of a group of tapered relatively inclined rollers mounted for planetary movement about a common central axis, control means encircling and contacting said rollers and moveable lengthwise thereof, a member moveable axially of said roller group to expand the latter against said encircling means, and means including a member rockable in response to the torque load on said encircling means for actuating said axially moveable member.

8. In a variable speed transmission, the combination of a group of tapered relatively inclined rollers mounted for planetary movement, control means encircling and contacting said rollers and movable lengthwise thereof, means moveable to develop contact pressures between said rollers and encircling means, and means including a member rockable in response to the torque load on said encircling means for actuating said moveable means.

9. In a variable speed transmission, the combination of a group of tapered relatively inclined rollers mounted for planetary movement, control means encircling and contacting said rollers and moveable lengthwise thereof to control their motion, means including a rock shaft for restraining said control means against rotating, and means energized by the torque load on said rock shaft for developing contact pressures between said rollers and said control means.

10. In a variable speed transmission, the combination of a group of tapered relatively inclined rollers mounted for planetary movement, control means encircling and contacting said rollers and axially moveable lengthwise thereof to regulate their motion, means for inducing pressure contact between said rollers and control means, a rock shaft energized by the torque load on said control means for energizing said last named means, and means coacting with said rock shaft and said control means for automatically varying the effect of said torque load on said pressure inducing means in accordance with changes in the axial position of said control means on said rollers.

11. In a variable speed transmission, the combination of a plurality of tapered relatively inclined rollers mounted for planetary movement, control means encircling and contacting said rollers and axially moveable lengthwise thereof, means energized by the torque load on said control means for inducing pressure contact between said rollers and said control means, and means for varying the effect of said torque load on said pressure inducing means in accordance with changes in the axial position of said control means on said rollers.

12. In a variable speed transmission, the combination of a plurality of tapered relatively inclined rollers mounted for planetary movement, a floating control ring encircling and contacting said rollers, means for shifting said ring lengthwise of said rollers to regulate their motion, and means separately engaged with said ring for restraining said ring against rotation.

13. In a variable speed transmission, the combination of a plurality of tapered relatively inclined rollers mounted for planetary movement, a control ring encircling and contacting said rollers, means for shifting said ring lengthwise of said rollers to regulate their motion, separate means for restraining said ring against rotation, and means responsive to the load on said last named means for inducing pressure contact between said rollers and ring.

14. In a variable speed transmission, the combination of a plurality of tapered relatively inclined rollers mounted for planetary movement, a floating control ring encircling and contacting said rollers, a ring actuator moveable to shift the latter axially lengthwise of said rollers, and means extending lengthwise of said rollers and separately engaged with said ring in all axial positions thereof to restrain the ring against rotation.

15. In a variable speed transmission, the combination of a plurality of tapered relatively inclined rollers mounted for planetary movement, a radially displaceable control ring encircling and contacting said rollers, ring actuating means effective to shift said ring lengthwise of said rollers without interfering with free rotation or radial displacement of said ring, and additional means separately engaged with said ring and effective to restrain said ring against rotation without interfering with free axial or radial displacement of said ring.

WALTER P. SCHMITTER.